(12) United States Patent
Nader et al.

(10) Patent No.: US 7,519,401 B2
(45) Date of Patent: Apr. 14, 2009

(54) EFFICIENT RADIO ENVIRONMENT CONDITION RECOGNITION

(75) Inventors: Ali G. Nader, Malmö (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 495 days.

(21) Appl. No.: 11/422,929

(22) Filed: Jun. 8, 2006

(65) Prior Publication Data

US 2007/0287510 A1      Dec. 13, 2007

(51) Int. Cl.
H04B 1/38         (2006.01)

(52) U.S. Cl. .................. 455/574; 455/434; 455/423; 370/311; 370/328

(58) Field of Classification Search ............... 455/574, 455/434, 423; 370/311, 328
See application file for complete search history.

(56) References Cited

U.S. PATENT DOCUMENTS

| 6,067,460 | A | 5/2000 | Alanara et al. | |
| 6,483,815 | B1 * | 11/2002 | Laurent et al. | 370/318 |
| 7,035,676 | B2 * | 4/2006 | Ranta | 455/574 |
| 7,110,765 | B2 * | 9/2006 | Amerga et al. | 455/436 |
| 7,133,702 | B2 * | 11/2006 | Amerga et al. | 455/574 |
| 7,415,273 | B2 * | 8/2008 | Khawand | 455/434 |
| 2002/0147008 | A1 * | 10/2002 | Kallio | 455/426 |
| 2003/0081657 | A1 * | 5/2003 | Ranta | 375/147 |

FOREIGN PATENT DOCUMENTS

| EP | 1 292 039 A2 | 3/2003 |
| GB | 2 328 582 A | 2/1999 |
| WO | 01/19100 A | 3/2001 |

OTHER PUBLICATIONS

European Standard Search Report, dated Dec. 20, 2006, in connection with U.S. Appl. No. 11/422,929.

* cited by examiner

*Primary Examiner*—Danh C Le
(74) *Attorney, Agent, or Firm*—Potomac Patent Group PLLC

(57) ABSTRACT

User equipment (UE) in a cellular telecommunications system is operated such that the UE begins operating in a power saving state when a first set of predefined criteria have been satisfied, and leaves the power saving state when a second set of predefined criteria have been satisfied. Determining satisfaction of the first set of predefined criteria includes making a plurality of signal quality measurements of a signal received from a serving cell in the telecommunications system, and making a plurality of signal quality measurements of a signal received from one or more neighboring cells. A first trend line is determined from the signal quality measurements of the serving cell, and a second trend line is determined from the signal quality measurements of the one or more neighboring cells. The first set of predefined criteria are considered to have been satisfied if the first and second trend lines are not converging.

16 Claims, 9 Drawing Sheets

EFFICIENT RADIO ENVIRONMENT CONDITION RECOGNITION

BACKGROUND

The present invention relates to mobile telecommunication systems, and more particularly to methods and apparatuses that determine when and/or what measurements user equipment (UE) in a telecommunication system will make of its surrounding environment.

Digital communication systems include time-division multiple access (TDMA) systems, such as cellular radio telephone systems that comply with the GSM telecommunication standard and its enhancements like GSM/EDGE, and Code-Division Multiple Access (CDMA) systems, such as cellular radio telephone systems that comply with the IS-95, cdma2000, and Wideband CDMA (WCDMA) telecommunication standards. Digital communication systems also include "blended" TDMA and CDMA systems, such as cellular radio telephone systems that comply with the Universal Mobile Telecommunications System (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS standard. This application focuses on WCDMA systems for economy of explanation, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (user equipment or users), respectively, in the downlink (base-to-user equipment) direction. User Equipment (UE) communicates with the system through, for example, respective dedicated physical channels (DPCHs). WCDMA terminology is used here, but it will be appreciated that other systems have corresponding terminology. Scrambling and channelization codes and transmit power control are well known in the art.

FIG. 1 depicts a mobile radio cellular telecommunication system 100, which may be, for example, a CDMA or a WCDMA communication system. Radio network controllers (RNCs) 112, 114 control various radio network functions including for example radio access bearer setup, diversity handover, and the like. More generally, each RNC directs UE calls via the appropriate base station(s) (BSs), which communicate with each other through downlink (i.e., base-to-UE or forward) and uplink (i.e., UE-to-base or reverse) channels. RNC 112 is shown coupled to BSs 116, 118, 120, and RNC 114 is shown coupled to BSs 122, 124, 126. Each BS serves a geographical area that can be divided into one or more cell(s). BS 126 is shown as having five antenna sectors S1-S5, which can be said to make up the cell of the BS 126. The BSs are coupled to their corresponding RNCs by dedicated telephone lines, optical fiber links, microwave links, and the like. Both RNCs 112, 114 are connected with external networks such as the public switched telephone network (PSTN), the Internet, and the like through one or more core network nodes like a mobile switching center (not shown) and/or a packet radio service node (not shown). In FIG. 1, UEs 128, 130 are shown communicating with plural base stations: UE 128 communicates with BSs 116, 118, 120, and UE 130 communicates with BSs 120, 122. A control link between RNCs 112, 114 permits diversity communications to/from UE 130 via BSs 120, 122.

At the UE, the modulated carrier signal (Layer 1) is processed to produce an estimate of the original information data stream intended for the receiver. The composite received baseband spread signal is commonly provided to a RAKE processor that includes a number of "fingers", or de-spreaders, that are each assigned to respective ones of selected components, such as multipath echoes or streams from different base stations, in the received signal. Each finger combines a received component with the scrambling sequence and the appropriate channelization code so as to de-spread a component of the received composite signal. The RAKE processor typically de-spreads both sent information data and pilot or training symbols that are included in the composite signal.

In cellular telecommunication systems, such as but not limited to the UMTS, there is a trade-off with respect to how often a UE should measure its surrounding environment, as well as the extent of those measurements. The more frequently a UE measures and keeps track of the surrounding environment (e.g., neighboring cells), the lower the possibility of experiencing loss of coverage, missing incoming calls, and the like. However, the more a UE actually measures, the more power it consumes. Since, more often than not, UEs are operated on battery power, higher power consumption associated with measurement activities leads to undesirable effects, such as lower standby time.

In some telecommunication systems, such as WCDMA systems, there exist measurement related threshold values (e.g., $S_{intrasearch}$, which is an optional parameter broadcast by the network that specifies the threshold (in dB) for intra frequency measurements; and QqualMin, which is a mandatory parameter broadcast by the network that defines the minimum required quality level (in dB) in the serving cell) that can optionally be broadcast by the network (NW) to the UEs in a cell. The UE may compare the measured signal quality of its received signal to the received threshold value(s), and based on this comparison stop performing measurements on the surrounding environment if the received signal quality of the cell currently camped on is above the received threshold value(s).

In some other cases, UE vendors have implemented their own hard-coded threshold values based on, for example, characteristics of their particular receiver blocks.

There are several problems with the existing implementations. For example, in some cases, such as the one described above in which there is a possibility of conveying measurement threshold values from the network to the UEs, network operators do not want to risk having the UEs measure too infrequently and consequently losing coverage or missing calls. The loss of services to UEs is both inconvenient and possibly vexatious to users and may result in a substantial loss of goodwill to the operator of the mobile network. Hence, such thresholds are either not sent at all or are set to such levels that they ensure that the UE will measure rather often, even under circumstances in which such measurement is totally unnecessary. In the most common cases, the UE normally performs its measurements during its Discontinuous Reception (DRX) cycles. That is, when not being operated by its user, the UE is normally in a sleep mode, with its radio turned off. However, at such DRX cycles the UE might receive messages and hence has to turn on its radio and scan some channels. As the radio is turned on anyway, the UE might coordinate its operations so that it performs its measurements during these occasions. However, many of these measurements are unnecessary if the UE is in a stable environment (e.g. when the UE is lying still on a table) because no new information would be obtained from such measurements.

In some other cases, the UE vendors have implemented their own hard-coded thresholds. These thresholds are often developed in a lab environment or by experiments performed in some real environment and are tightly coupled with the radio characteristics of the specific UE. The problem in such cases is the inability to adapt these thresholds to the real surrounding environment.

All these unnecessary measurements drain the battery power and affect the standby time of the UE.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate User Equipment (UE) in a cellular telecommunications system in such a way that the UE is caused to begin operating in a power saving state by determining that a first set of predefined criteria have been satisfied, and is caused to leave the power saving state by determining that a second set of predefined criteria have been satisfied. In one aspect, determining that the first set of predefined criteria have been satisfied includes making a plurality of signal quality measurements of a signal received from a serving cell in the telecommunications system, and making a plurality of signal quality measurements of a signal received from one or more neighboring cells in the telecommunications system. A first trend line is determined from the signal quality measurements of the serving cell in the telecommunications system, and a second trend line is determined from the signal quality measurements of the one or more neighboring cells in the telecommunications system. It is then determined that the first set of predefined criteria have been satisfied if the first and second trend lines are not converging.

In another aspect, it is determined that the first set of predefined criteria have been satisfied if a current signal quality measurement satisfies a predetermined relationship with respect to a term derived from one or more telecommunication network-supplied parameters. For example, when the telecommunications system is a Wideband Code Division Multiple Access (WCDMA) telecommunications system the term derived from the one or more telecommunication network-supplied parameters may be $S_{intrasearch}+QqualMin$, wherein $S_{intrasearch}$ is a parameter that specifies a threshold for intra-frequency measurements, and QqualMin defines a minimum required quality level within the serving cell.

In yet another aspect, the power saving state comprises a limited rate measurement state and a lower rate measurement state. In the limited rate measurement state, the user equipment makes the plurality of signal quality measurements of the signal received from the one or more neighboring cells in the telecommunications system at a lower rate than in a full rate measurement state. In the lower rate measurement state in which the user equipment performs no measurements of the signal received from the one or more neighboring cells in the telecommunications system.

In still another aspect, causing the UE to begin operating in the power saving state comprises initially causing the UE to begin operating in the limited rate measurement state and causing the UE to begin operating in the lower rate measurement state in response to detecting that the first and second trend lines are diverging at an increasing rate.

In yet another aspect, determining the first trend line from the signal quality measurements of the serving cell in the telecommunications system comprises determining a moving average of the signal quality measurements of the serving cell in the telecommunications system; and determining the first trend line from the moving average of the signal quality measurements of the serving cell in the telecommunications system. Furthermore, determining the second trend line from the signal quality measurements of the one or more neighboring cells in the telecommunications system comprises determining a moving average of the signal quality measurements of the one or more neighboring cells in the telecommunications system; and determining the second trend line from the moving average of the signal quality measurements of the one or more neighboring cells in the telecommunications system.

In alternative embodiments, operation of a UE in a cellular telecommunications system includes causing the UE to begin operating in a power saving state by determining that a first set of predefined criteria have been satisfied; and causing the UE to leave the power saving state by determining that a second set of predefined criteria have been satisfied. Determining that the first set of predefined criteria have been satisfied includes making a plurality of signal quality measurements of a signal received from a serving cell in the telecommunications system and making a plurality of signal quality measurements of a signal received from one or more neighboring cells in the telecommunications system. A first long trend line is determined from the signal quality measurements of the serving cell in the telecommunications system, and a first short trend line is determined from the signal quality measurements of the serving cell in the telecommunications system. A second long trend line is determined from the signal quality measurements of the one or more neighboring cells in the telecommunications system and a second short trend line is determined from the signal quality measurements of the one or more neighboring cells in the telecommunications system. The first set of predefined criteria are considered to have been satisfied if the first and second long trend lines are not converging and the first and second short trend lines are not converging.

In another aspect, the first set of predefined criteria are considered to have been satisfied if the first and second long trend lines are not converging and the first and second short trend lines are converging at a rate that is lower than a predetermined slow rate.

BRIEF DESCRIPTION OF THE DRAWINGS

The objects and advantages of the invention will be understood by reading the following detailed description in conjunction with the drawings in which.

DETAILED DESCRIPTION

Figure 1:
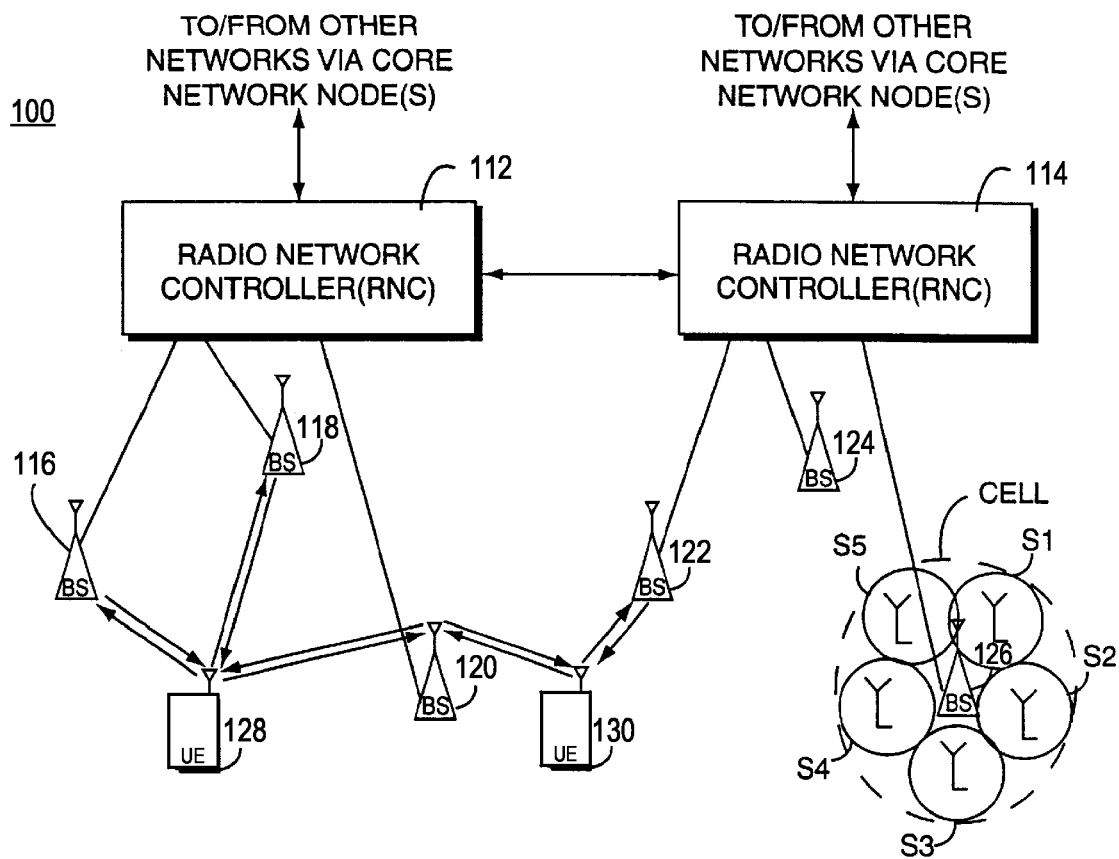
FIG. 1 depicts a mobile radio cellular telecommunication system 100, which may be, for example, a CDMA or a WCDMA communication system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect, methods and/or apparatuses operate a UE in such a way that it does not perform measurements of its surrounding environment at a high rate when it is situated in a stable condition. In this way, the UE can avoid a needless expenditure of energy.

In another aspect, detecting whether the UE is in a stable condition is not limited to the use of fixed threshold values. Instead, measurements of the serving cell and of the measured surroundings are analyzed to dynamically detect whether the UE is in a stable environment. Once stable/unstable conditions are recognized, the UE may go into an appropriate one of a number of different states and perform measurements at a higher or lower intensity as is appropriate for the detected environment.

In another aspect, a number of different measurement states can be provided in a UE. For example, the following measurement states can be defined:

Full Measurement State, in which measurements and searches for new cells are required.

Limited Measurement State, in which measurements and searches are performed for new cells, but with a lower rate than is performed in the Full Measurement State.

Low Rate Measurement State, in which measurements and searches are performed for the serving cell (cell currently connected to) and possibly one additional cell in order to estimate when the environment has changed.

These and other aspects will now be described in greater detail.

In order to facilitate a better understanding of the various aspects of the invention, the exemplary embodiments presented herein are described in the context of a WCDMA system. In this context, the measured Received Signal Code Power is referred to as RSCP, the measured signal-to-noise ratio is referred to as Ec/Io, and the cell that a UE is currently connected to (which in a WCDMA system will be the strongest cell in the vicinity) is referred to as the serving cell. It is further assumed that the various steps and processes described herein are performed during DRX cycles. Notwithstanding these contexts, it is to be understood that the embodiments described herein are merely exemplary, and are not to be construed as limiting the invention to WCDMA systems, the mentioned measured entities, or DRX modes.

The term "measured surroundings" is used throughout the description. As used herein, this term should be construed broadly to include at least any of the following:

Measured value of the best non-serving neighboring cell.

Average of measured values of a predetermined number of the best non-serving neighboring cells.

Weighted average of measured values of a predetermined number of the best non-serving neighboring cells.

Weighted sum of measured values of a predetermined number of the best non-serving neighboring cells.

As mentioned earlier, in order to enable the UE to avoid a needless expenditure of energy, it is operated in such a way that it does not perform measurements of its surrounding environment at a high rate when it is situated in a stable condition. More particularly, depending on the level of environmental stability, the UE can enter a suitable one of a number of predefined measurement states. Such measurement states can include:

Full Rate Measurement State: In this state, measurement and cell search rates are in steady state as specified by the applicable standards (e.g., those defined by the 3GPP specifications). When entering this state from any of the other measurement states, the rate of cell searching increases (and can even be designed to be continuous during an initial predetermined period of time).

Power Saving State: In this state, measurement and/or cell searches are performed at a reduced rate (compared to the Full Rate Measurement State), so that the UE is able to conserve energy. The Power Saving State can, for example be one or (as will be explained later in the description) both of the following:

Limited Rate Measurement State: In this state, measurements on the serving cell are performed at the same rate as specified in the applicable standards. However, the rate of measuring the measured surroundings is lower. The rate of cell searching (which is the most power consuming activity) is also decreased by a predefined factor.

Low Rate Measurement State: In this state, measurements are performed only on the serving cell (and in alternative embodiments, also on the best non-serving cell) at the same rate as is specified by the applicable standards. No other measurements are performed on the measured surroundings. However, the measurement results on the surroundings just prior to entering this state are retained in a cell database so that these cells can (if still available) be found again when leaving his state.

In the above-described states, the Ec/Io and/or the RSCP measurements of the serving cell and possible measured surroundings are filtered in a relatively long (e.g., on the order of 1 second or longer) averaging Infinite Impulse Response (IIR) filter to obtain a good estimate of an average value of the measurement(s).

The discussion will now focus on techniques and apparatuses for detecting whether the UE is moving, or is otherwise in an unstable environment that would require more frequent measurements. For this purpose, the RSCP (e.g., as measured on the Common Pilot Channel, or "CPICH", in WCDMA systems) is useful in the sense that it measures the path loss, which is related to the UE's distance from the base station. Thus, changes in RSCP are better at detecting physical movement of the UE than are measurements of the Ec/Io. When the UE is not close to the serving cell's border, the Ec/Io (e.g., as measured on the CPICH in WCDMA systems) is relatively stable because the inter-cell interference is dominant. When moving, both the cell interference and the RSCP are changing. Consequently, the ratio between the RSCP and the total interference (Ec/Io) is relatively constant.

The Ec/Io is, however, a better indicator of performance in a CDMA system because CDMA systems are interference limited. Changes in UE performance may be another trigger for changing from one measurement state to another.

In an aspect of the invention, analytical techniques are used, either alone or in conjunction with threshold-based techniques, in order to determine whether a UE is in a stable environment. More particularly, measurements of a UE's serving cell as well as of its surroundings are analyzed to detect whether the UE is in a sufficiently stable environment so as to permit it to stop measuring neighboring cells, and also when to stop searching for new neighbors.

Figure 2:
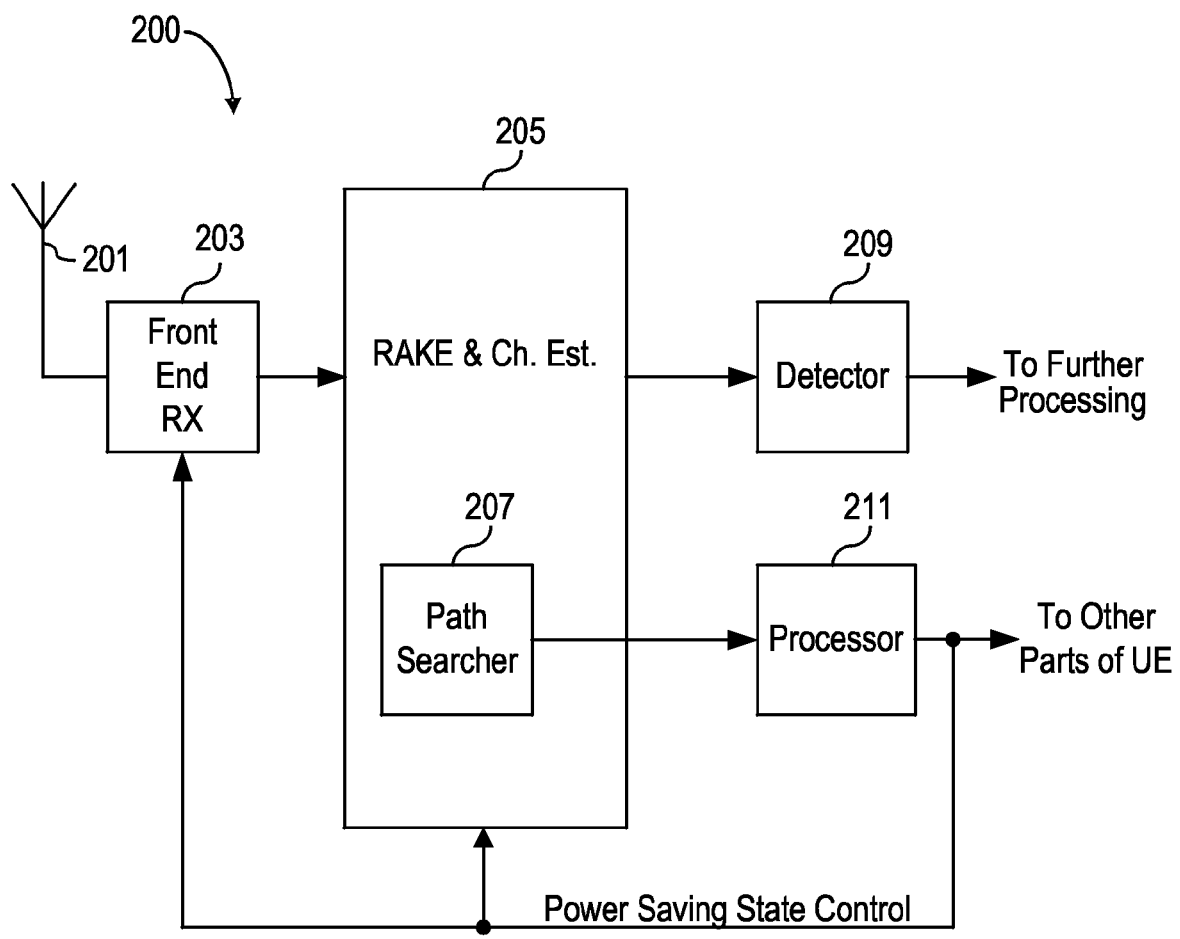
FIG. 2 is a block diagram of a receiver, such as a UE in a WCDMA communication system.

These and other aspects will now be described in greater detail. Looking first at exemplary hardware for carrying out the variously described processes, FIG. 2 is a block diagram of a receiver 200, such as a UE in a WCDMA communication system, that receives radio signals through an antenna 201 and down-converts and samples the received signals in a front-end receiver (Front End RX) 203. The output samples are fed from Fe RX 203 to a RAKE combiner and channel estimator 205 that de-spreads the received data including the pilot channel, estimates the impulse response of the radio channel, and de-spreads and combines received echoes of the received data and control symbols. In order to de-spread the received signal, the RAKE combiner and channel estimator 205 needs to know which, of the possible paths that the received signal might be spread on, are the strongest ones. In order to identify these strongest paths (experienced by the receiver 200 as delayed receipt of the signal), the RAKE combiner and channel estimator 205 includes a path searcher 207. An output of the combiner/estimator 205 is provided to a symbol detector 209 that produces information that is further processed as appropriate for the particular communication system. RAKE combining and channel estimation are well known in the art.

In exemplary embodiments, the path searcher 207 is the unit that carries out the various measurements (e.g., RSCP and Ec/Io) of the measured surroundings described herein. A consequence of this is that every time the path searcher 207 is called on to perform such measurements, it is also performing a path search operation, thereby expending more power.

The various measurements described herein are supplied to a processor 211, which carries out the processes described herein. In the exemplary embodiment, the processor 211 is depicted as a unit separate and apart from other units. However, in alternative embodiments, the processor may be implemented as part of another unit, and programmed or hard-wired to perform the herein-described operations in addition to other functions. In still other alternative embodiments, two or more processors may be utilized to carry out the techniques described herein, with each processor assigned only a subset of the total number of tasks that must be executed.

Figure 3:
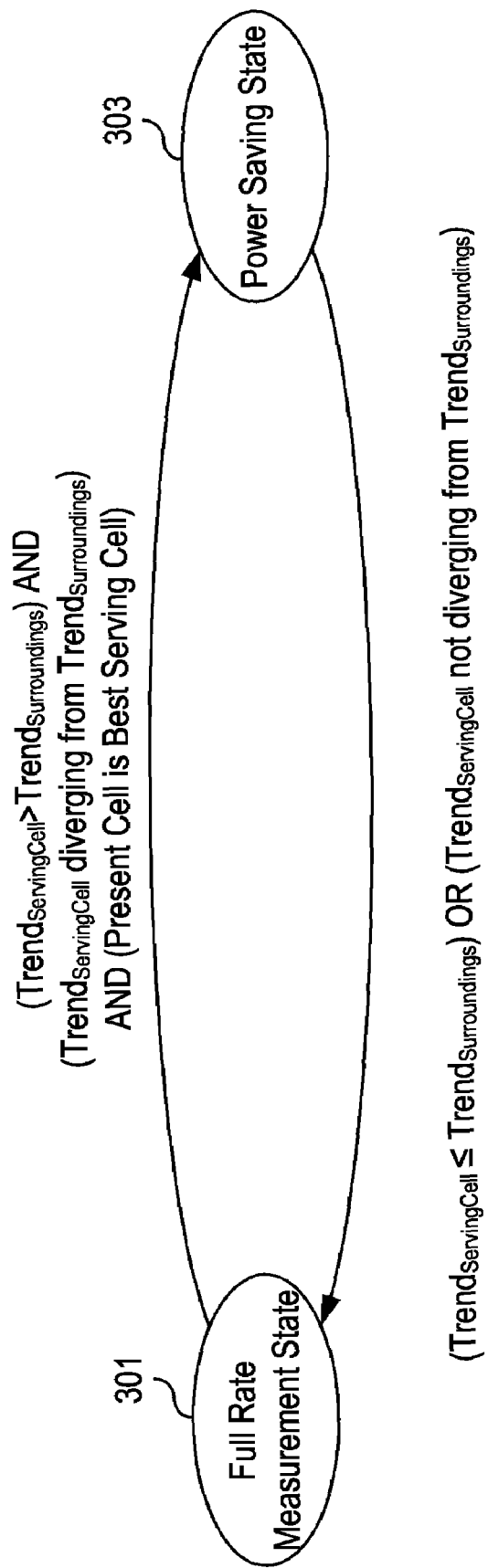
FIG. 3 is a state transition diagram that shows how state changes are made in accordance with an embodiment of the invention.

As mentioned earlier, measurement state changes are triggered based on the results of one or more analyses of measurements of the UE's Serving Cell and measurements of the UE's surroundings. FIG. 3 is a state transition diagram that shows how state changes are made in accordance with an embodiment of the invention. In this embodiment, the UE operates in one of two states: Full Rate Measurement State 301, and Power Saving State 303. Upon power up, for example, the UE may start out in Full Rate Measurement State 301. As part of its operation, the UE periodically measures the Ec/Io value of its serving cell (e.g., by measuring the CPICH of its serving cell). A current value of the measured Ec/Io is herein denoted "CurrServEcIo". The UE also periodically measures the RSCP of its serving cell. A current value of the measured RSCP is herein denoted "CurrServRscp". Similar measurements are also made on signals received from the UE's surroundings. These various measurements are collected and analyzed to determine whether the UE should change from one of the states 301, 303 to another 303, 301.

Figure 4A:
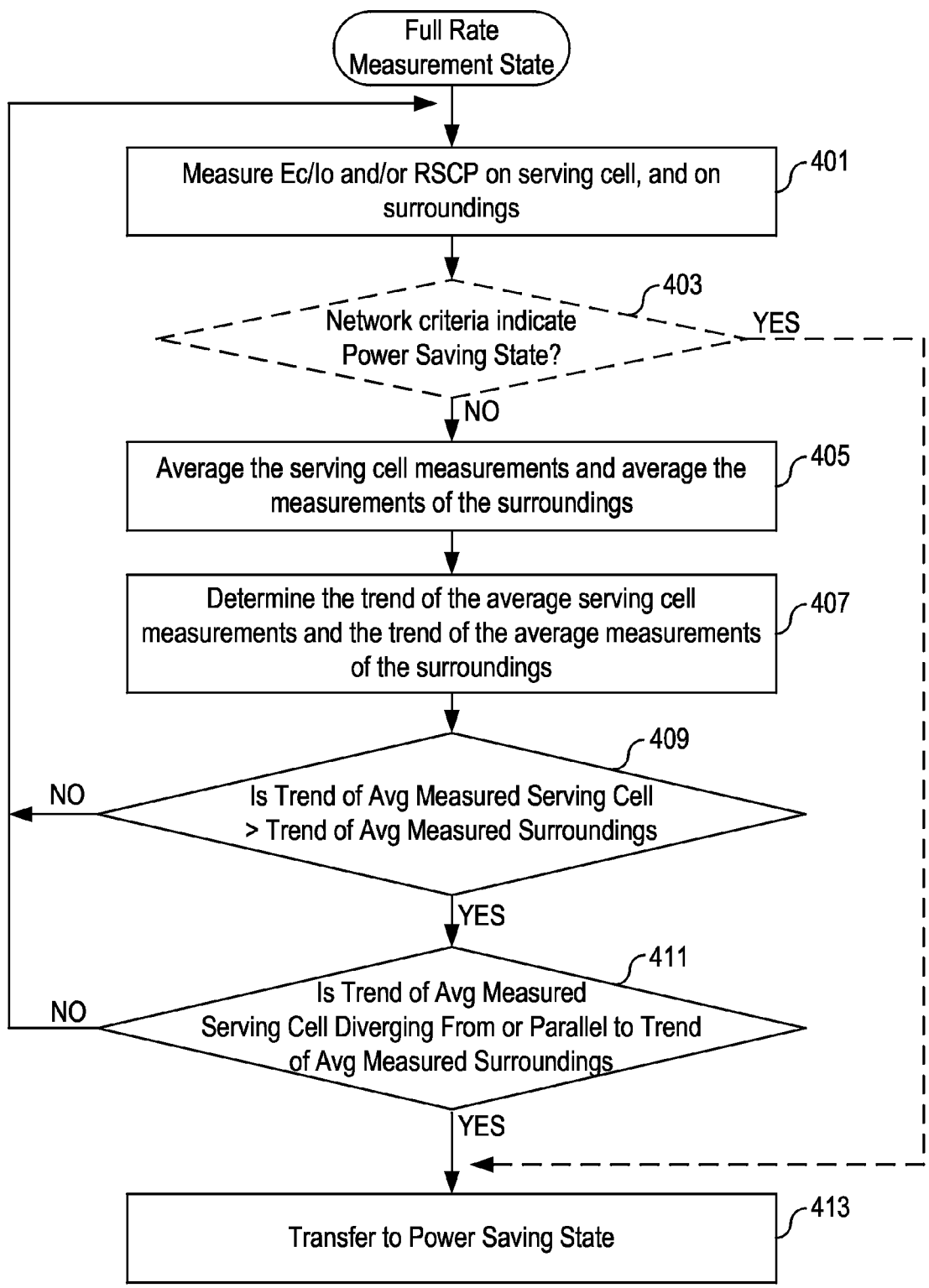
FIG. 4*a* is a flowchart of exemplary logic for determining whether to transition the UE's operation from Full Rate Measurement State to Power Saving State.
Figure 5:
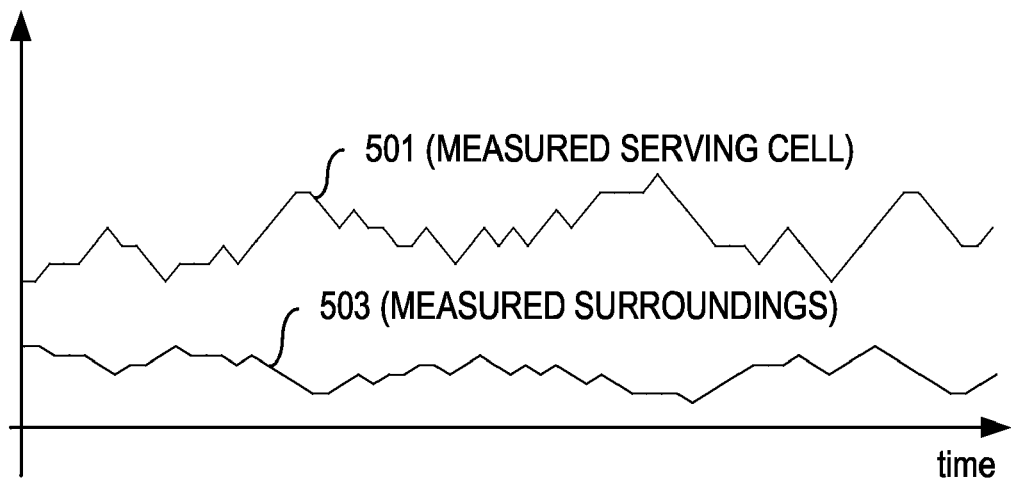
FIG. 5 depicts two graphs of exemplary measurements collected over a period of time: a first graph 501 showing measurements of the serving cell, and a second graph 503 showing measurements of the surroundings.

FIG. 4a is a flowchart of exemplary logic for determining whether to change the UE's operation from Full Rate Measurement State to Power Saving State. The goal of this embodiment is to make decisions based on an analysis of the convergence of the trends of measurements of the serving cell and of the surroundings. More specifically, Ec/Io and/or RSCP measurements are performed on signals received from the serving cell and from the UE's surroundings (step 401). FIG. 5 depicts two graphs of exemplary measurements collected over a period of time: a first graph 501 showing measurements of the serving cell, and a second graph 503 showing measurements of the surroundings.

In one aspect, the technique of making decisions based on an analysis of the convergence of the trends of measurements of the serving cell and of the surroundings can be used alone, or alternatively in conjunction with other techniques for determining whether the UE should enter the Power Saving State 303. The capability of combining the present invention with other techniques is represented in FIG. 4a by the decision block 403 (depicted in dashed lines to indicate its optional inclusion in the embodiment), which in this embodiment is a test to determine whether criteria, established by the network in which the UE is participating, indicate that the UE should enter the Power Saving State 303. Such criteria might include, for example, the measured values satisfying a particular relationship with respect to one or more network configured/broadcast threshold values. For example, in telecommunications systems that operate in accordance with WCDMA standards, network-established criteria for entering the Power Saving State 303 may be satisfied if a current signal quality measurement satisfies a predetermined relationship with respect to a term derived from one or more telecommunication network-supplied parameters. The term derived from the one or more telecommunication network-supplied parameters can be, for example, $S_{intrasearch}+$ QqualMin, wherein $S_{intrasearch}$ is a parameter that specifies a threshold for intra-frequency measurements, and QqualMin defines a minimum required quality level within the serving cell. If there exist network configured/broadcast offset values, for example in the neighboring cell lists, that require increasing or decreasing the measured values of the cells before they are tested, then these should be considered in the threshold calculation process.

Returning now to a discussion of the more general case, if such criteria are satisfied ("YES" path out of decision block 403), then the UE changes to the Power Saving State 303 (step 413) regardless of what the outcome might be based on an analysis of the trend lines.

Figure 6:
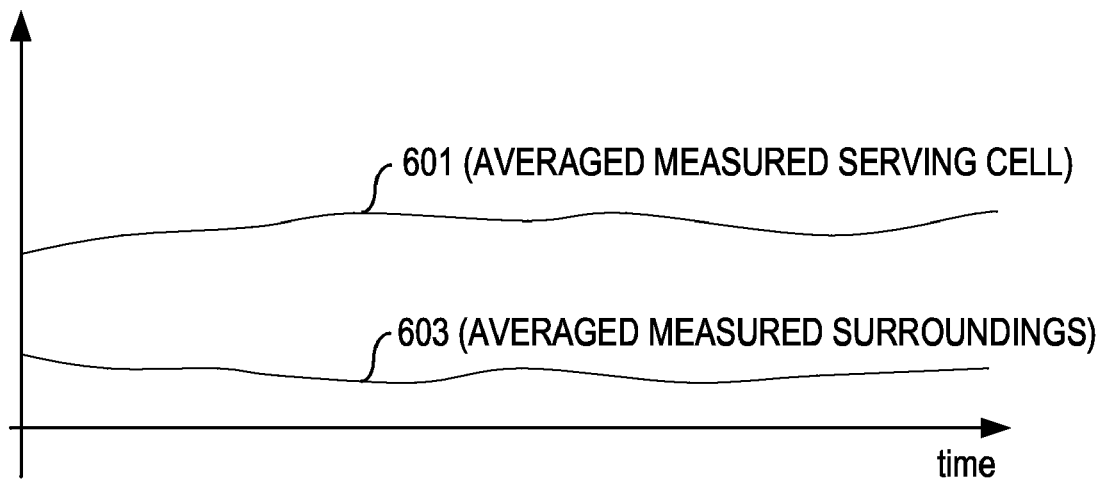
FIG. 6 depicts two graphs of exemplary measurements after having been averaged: a first graph 601 showing average measurements of the serving cell, and a second graph 603 showing average measurements of the surroundings.

If any such criteria are not satisfied ("NO" path out of decision block 403), or if a test such as decision block 403 is not included in the embodiment, then processing continues by filtering the measurements of the serving cell and of the surroundings in a (preferably) long averaging Infinite Impulse Response (IIR) filter to obtain average values of the measurements (step 405). A purpose of this filtering is to eliminate noise and fading from the measurements. FIG. 6 depicts two graphs of exemplary measurements after having been averaged as just described: a first graph 601 showing average measurements of the serving cell, and a second graph 603 showing average measurements of the surroundings.

Figure 7A:
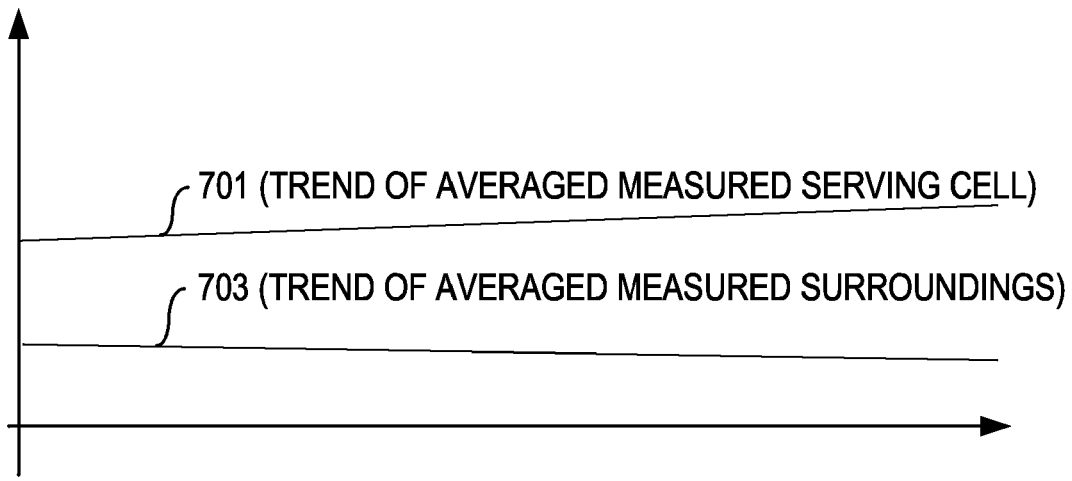
FIG. 7a depicts two graphs of exemplary trend lines: a first graph depicting a trend line of average serving cell measurements and a second graph depicting a trend line of average measurements of surroundings.

Next, the trends of the averaged measurements are calculated (step 407). FIG. 7a depicts two graphs of exemplary trend lines: a first graph 701 depicting a trend line of average serving cell measurements and a second graph 703 depicting a trend line of average measurements of surroundings. A number of different techniques for determining a trend are known in the art, and therefore need not be described here in detail. Among the simplest of the techniques are:

determining a moving average over an uneven number of periods; or
 determining a centered moving average over an even number of periods.

Moving averages with different time spans each tell a different story. The shorter the time span, the more sensitive the moving average is to changes. The longer the time span, the less sensitive (or the smoother) the moving average will be. Moving averages are used to emphasize the direction of a trend and smooth out fluctuations or "noise" that can confuse interpretation. In order to reduce the lag in simple moving averages, technicians often use exponential moving averages (EMA), which are also called exponentially weighted moving averages. An exponential moving average is calculated by applying a percentage of a current value to a previous moving average value.

Other less common types of moving averages include triangular, variable, and weighted moving averages. All of these are slight variations of the types discussed above, and are used to detect different characteristics such as volatility, and to weight different time spans.

Having determined a trend line for each of the averaged measured serving cell and averaged measured surroundings, the convergence of these trends is analyzed, and decisions are made based on this analysis. As long as the trend line of the serving cell is above the trend line of the measured surroundings and the trend lines are not converging (i.e., either parallel to one another or diverging), as illustrated in FIG. 7a, it can be concluded that the UE is already camped on the best possible cell. Since this is what is required in a WCDMA system, there is no point in measuring the surroundings.

Accordingly, in the exemplary embodiment a test is performed to determine whether the trend of the average measure of the serving cell is greater than the trend of the average measure of the surroundings (decision block 409). If it is not ("NO" path out of decision block 409), then the criteria for transferring to Power Saving State 303 are not satisfied, and execution returns to step 401 so that testing can again be performed after new measurements are taken.

If the trend of the average measure of the serving cell is greater than the trend of the average measure of the surroundings ("YES" path out of decision block 409), then further testing determines whether the trend line representing the average measure of the serving cell is either diverging from, or parallel to the trend line representing the average measure of the surroundings (decision block 411). If it is neither ("NO" path out of decision block 411), then the criteria for transferring to Power Saving State 303 are not satisfied, and execution returns to step 401 so that testing can again be performed after new measurements are taken.

However, if the trend line representing the average measure of the serving cell is either diverging from or parallel to the trend line representing the average measure of the surroundings ("YES" path out of decision block 411), then the UE changes to the Power Saving State 303 (step 413).

The discussion will now focus on an alternative embodiment that utilizes a combination of short and long trend lines to determine whether the operation of the UE should change to the Power Saving State. In one aspect, measurements of the serving cell and of the surroundings are used to generate long trend lines. (As used herein, the terms "long" and "short" refer to the relative number of measurement values that are combined (e.g., averaged) to determine each point in the trend line, with a long trend line utilizing more measurement values than a short trend line.) The use of a long trend line ensures that "noise" will be filtered out of the measurements so that a reliable decision can be made. However, the longer the trend, the less sensitive the UE will be to sudden changes in the UE's environment. Thus, short trend lines are also computed from the measurements of the serving cell and also from the measurements of the UE's surroundings. These short trend lines will better indicate whether there are any sudden changes in the UE's environment that should continue to be monitored in the Full Rate Measurement State 301. The strategy that is adopted is as follows: If the long trend line of the serving cell is above the long trend line of the measured surroundings and the long trend lines are either diverging or parallel to one another, then the short trend lines are similarly compared. Only if all of the tests involving the long and short trend lines are satisfied is the UE permitted to change operation to the Power Saving State 303.

Figure 4B:
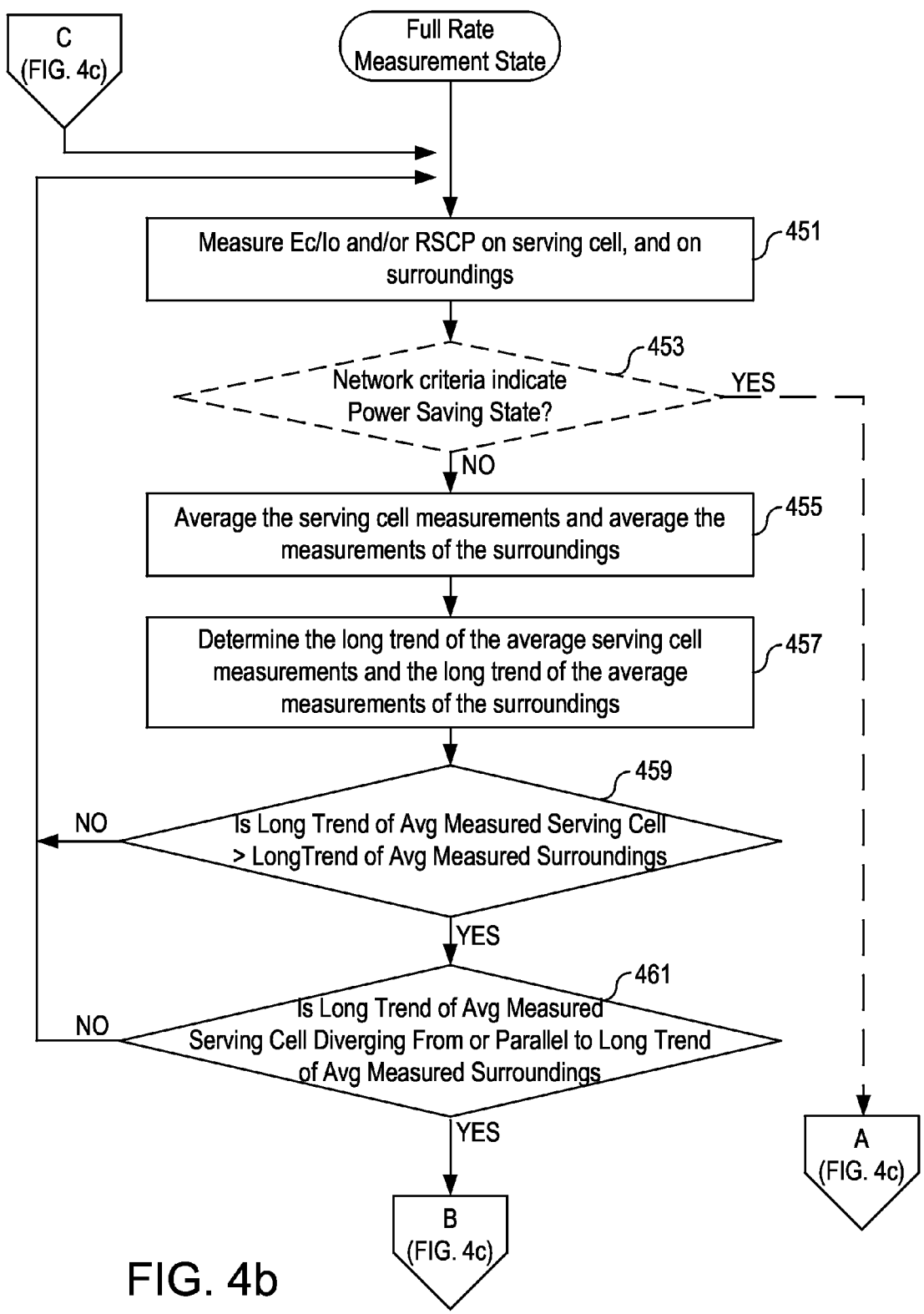
FIGS. 4*b* and 4*c* together are a flow chart of an alternative exemplary embodiment that utilizes both long and short trend lines to determine whether to transition the UE's operation from Full Rate Measurement State to Power Saving State.
Figure 4C:
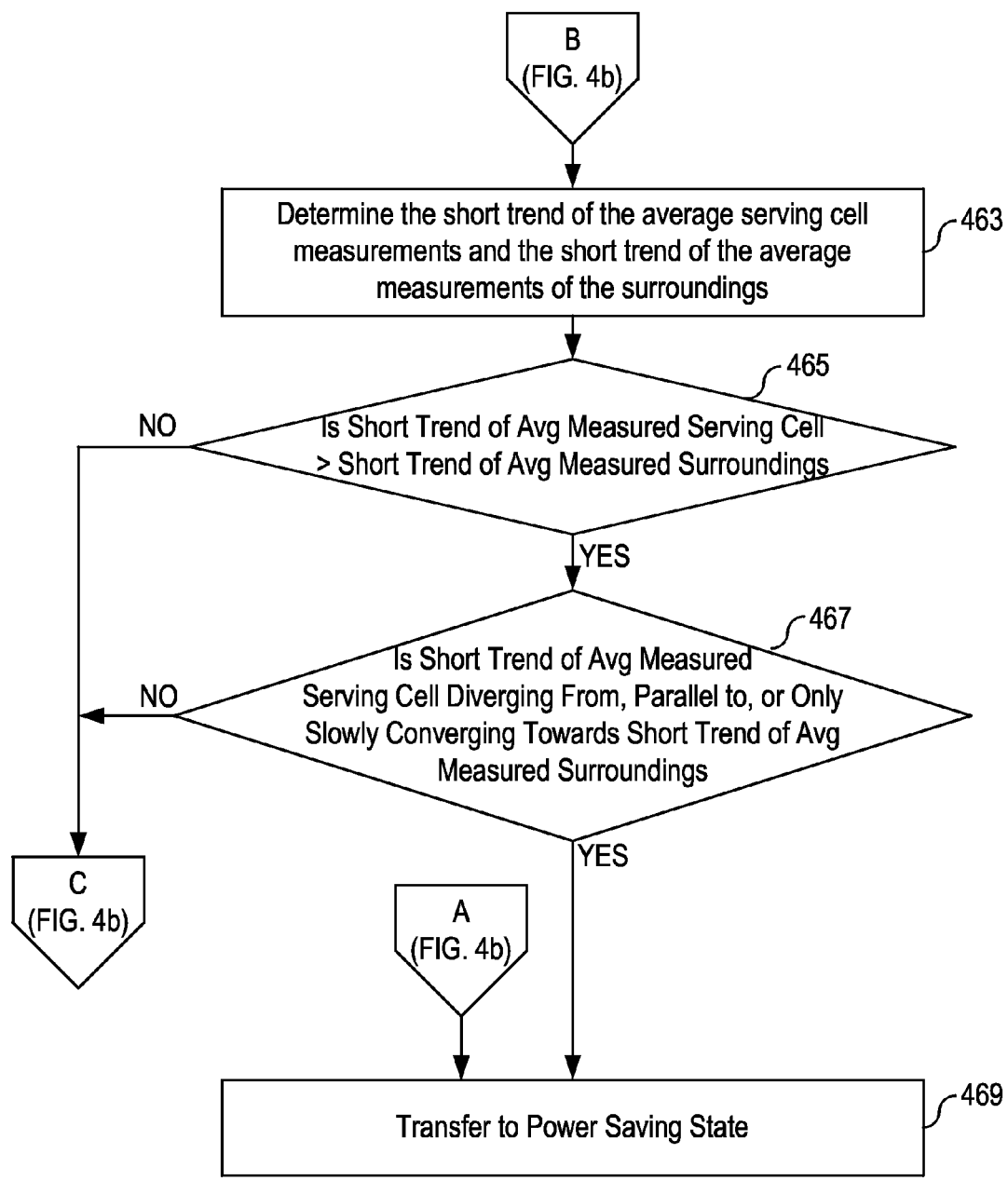

FIGS. 4b and 4c together are a flow chart of an exemplary embodiment that utilizes both long and short trend lines to determine whether to change the UE's operation from Full Rate Measurement State to Power Saving State. Ec/Io and/or RSCP measurements are performed on signals received from the serving cell and from the UE's surroundings (step 451).

In one aspect, the technique of making decisions based on an analysis of the convergence of the trends of measurements of the serving cell and of the surroundings can be used alone, or alternatively in conjunction with other techniques for determining whether the UE should enter the Power Saving State 303. The capability of combining the present invention with other techniques is represented in the flow chart of FIGS. 4b and 4c by the decision block 453 (depicted in dashed lines to indicate its optional inclusion in the embodiment), which in this embodiment is a test to determine whether criteria, established by the network in which the UE is participating, indicate that the UE should enter the Power Saving State 303. Such criteria might include, for example, the measured values satisfying a particular relationship with respect to one or more network configured/broadcast threshold values, as discussed more fully above with respect to decision block 403 (see FIG. 4a).

Returning now to a discussion of the more general case, if such criteria are satisfied ("YES" path out of decision block 453), then the UE changes to the Power Saving State 303 (step 469) regardless of what the outcome might be based on an analysis of the trend lines.

If any such criteria are not satisfied ("NO" path out of decision block 453), or if a test such as decision block 453 is not included in the embodiment, then processing continues by filtering the measurements of the serving cell and of the surroundings in a (preferably) long averaging Infinite Impulse Response (IIR) filter to obtain average values of the measurements (step 455). A purpose of this filtering is to eliminate noise and fading from the measurements.

Next, the long trends of the averaged measurements are calculated (step 457). A number of different techniques for determining a trend are known in the art, and therefore need not be described here in detail. The discussion presented above with respect to step/process 407 is equally applicable here. Additionally, what qualifies as "long" can vary from one embodiment to the next because it is dependent upon what the measurement sample rate and the UE speed are. As an example, consider a case in which the UE is moving at a moderate speed, or that the cell's sizes are moderate. (This can be determined by, for example, keeping track of the number of cell changes during some number of immediately preceding seconds.) Under such circumstances, a long trend could, for example, mean a trend based on the 20 latest samples if the sample rate is 1 sample/sec. Alternatively, a long trend could, for example, be a trend based on the latest 10 samples if the sample rate is 2 samples/sec.

Figure 7B:
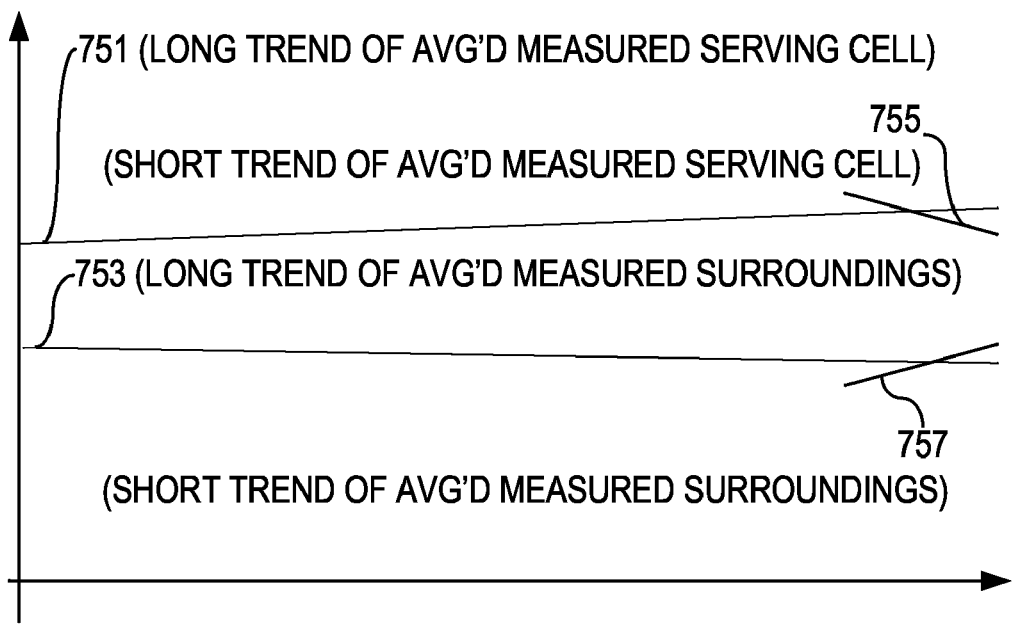
FIG. 7b depicts four graphs of exemplary trend lines: a first graph depicting a long trend line of average serving cell measurements, a second graph depicting a long trend line of average measurements of surroundings, a third graph depicting a short trend line of average serving cell measurements, and a fourth graph depicting a short trend line of average measurements of surroundings.

FIG. 7b depicts four graphs of exemplary trend lines: a first graph 751 depicting a long trend line of average serving cell measurements, a second graph 753 depicting a long trend line of average measurements of surroundings, a third graph 755 depicting a short trend line of average serving cell measurements, and a fourth graph 757 depicting a short trend line of average measurements of surroundings.

Having determined a long trend line for each of the averaged measured serving cell and averaged measured surroundings, the convergence of these trends is analyzed, and further decisions are made based on this analysis. As long as the long trend line of the serving cell is above the long trend line of the measured surroundings and the long trend lines are either diverging from one another, as illustrated in FIG. 7b, or parallel to one another, there is evidence that the UE is already camped on the best possible cell, so the UE may not need to make further measurements of the surroundings.

Accordingly, in the exemplary embodiment a test is performed to determine whether the long trend of the average measure of the serving cell is greater than the long trend of the average measure of the surroundings (decision block 459). If it is not ("NO" path out of decision block 459), then the criteria for transferring to Power Saving State 303 are not satisfied, and execution returns to step 451 so that testing can again be performed after new measurements are taken.

If the long trend of the average measure of the serving cell is greater than the long trend of the average measure of the surroundings ("YES" path out of decision block 459), then further testing determines whether the long trend line representing the average measure of the serving cell is either diverging from, or parallel to, the long trend line representing the average measure of the surroundings (decision block 461). If it is neither ("NO" path out of decision block 461), then the criteria for transferring to Power Saving State 303 are not satisfied, and execution returns to step 451 so that testing can again be performed after new measurements are taken.

However, if the long trend line representing the average measure of the serving cell is either diverging from, or parallel to, the long trend line representing the average measure of the surroundings ("YES" path out of decision block 461), then further testing is performed to make sure that short-term conditions do not suggest that the UE should remain in the Full Rate Measurement State 301.

More particularly, the short trends of the averaged measurements are calculated (step 463). (For an example, reference is again made to the short trend lines 755, 757 illustrated in FIG. 7b.) A number of different techniques for determining a trend are known in the art, and therefore need not be described here in detail. The discussion presented above with respect to step/process 407 is equally applicable here. As to what is meant by "short", what qualifies as "short" can vary from one embodiment to the next because it is dependent upon what the measurement sample rate and the UE speed (or cell size) are. In any case, the "short" trend is shorter than the "long" trend, and should be sized appropriately so that it can quickly detect environmental changes. In the example presented above with respect to "long" trends (i.e., in which the sample rate is 1 sample/sec), a short trend could be a trend based on the latest 2 to 3 samples.

Having determined a short trend line for each of the averaged measured serving cell and averaged measured surroundings, the convergence of these trends is analyzed, and further decisions are made based on this analysis. As long as the short trend line of the serving cell is above the short trend line of the measured surroundings and the short trend lines are alternatively diverging from one another, parallel to one another, or are converging very slowly towards one another, there is evidence that the UE is already camped on the best possible cell, so the UE may not need to make further measurements of the surroundings. Whether convergence is "slow" can be checked by, for example, observing the difference between the two short trends and determining whether the rate at which that difference is changing is greater than a predefined amount. For example, if the short trends are converging and the difference between the samples in the short trend of the serving cell and the short trend of the measured surroundings is decreasing by more than some amount (e.g., 3 dB) per sample, then one can assume fast convergence.

Accordingly, in the exemplary embodiment a test is performed to determine whether the short trend of the average measure of the serving cell is greater than the short trend of the average measure of the surroundings (decision block 465). If it is not ("NO" path out of decision block 465), then the criteria for transferring to Power Saving State 303 are not satisfied, and execution returns to step 451 so that testing can again be performed after new measurements are taken.

If the short trend of the average measure of the serving cell is greater than the short trend of the average measure of the surroundings ("YES" path out of decision block 465), then further testing determines whether the short trend line representing the average measure of the serving cell is diverging from, parallel to, or only very slowly converging toward the short trend line representing the average measure of the surroundings (decision block 467). If it is none of these ("NO" path out of decision block 467), then the criteria for transferring to Power Saving State 303 are not satisfied, and execution returns to step 451 so that testing can again be performed after new measurements are taken.

However, if the short trend line representing the average measure of the serving cell is either diverging from, parallel to, or only very slowly converging toward the short trend line representing the average measure of the surroundings ("YES" path out of decision block 467), then the operation of the UE changes to the Power Saving State 303 (step 469).

Determining whether to leave the Power Saving State 303 to return to the Full Rate Measurement State 301 can be performed in accordance with any number of techniques, including conventional techniques (e.g., determining whether criteria, established by the network in which the UE is participating, indicate that the UE should leave the Power Saving State 303).

Figure 8:
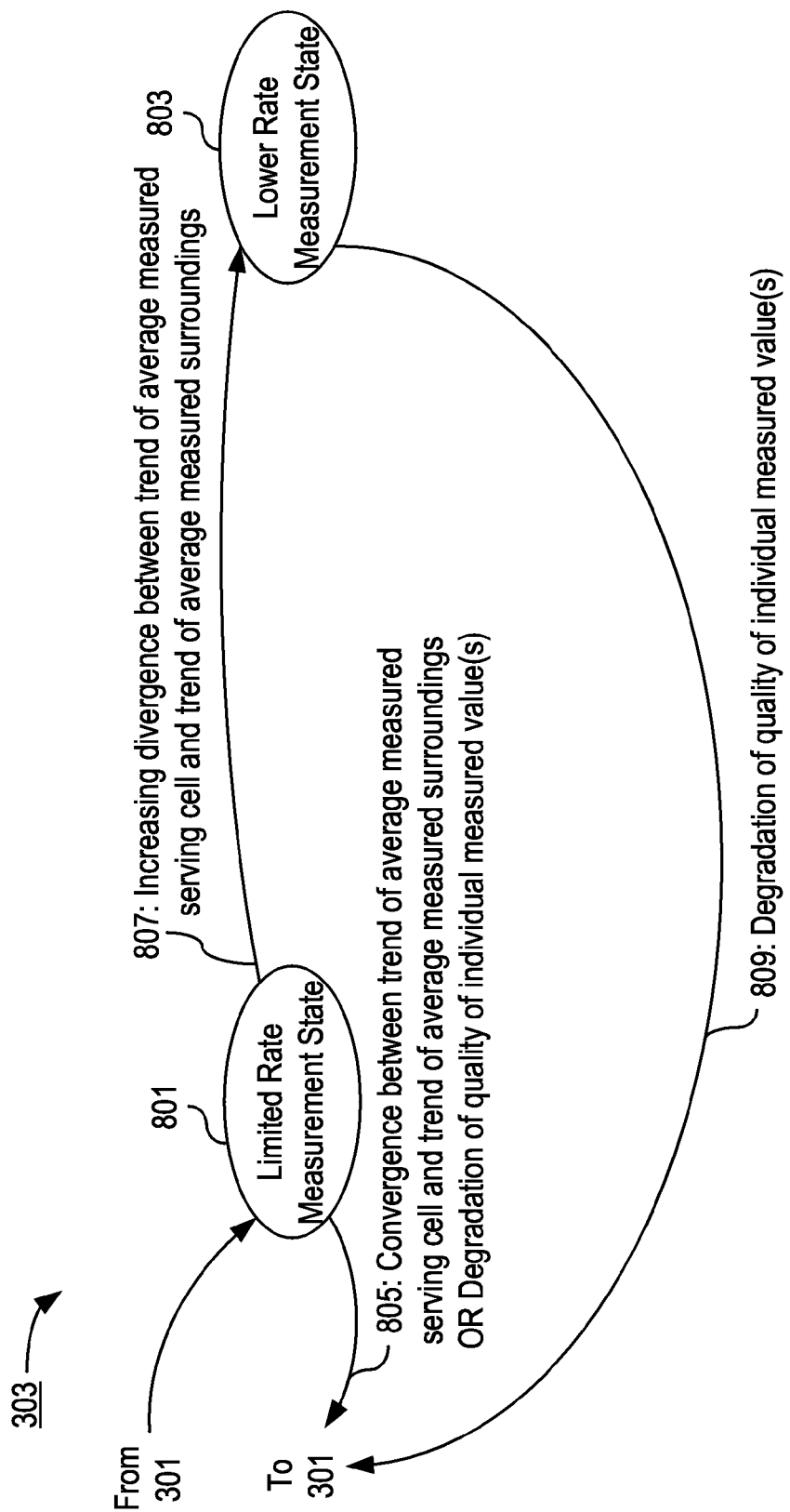
FIG. 8 is a state transition diagram that shows how state changes are made to, from, and within a Power Saving State in accordance with an embodiment of the invention.

As mentioned earlier, the Power Saving State 303 may represent a single state, for example, either Limited Rate Measurement State or Lower Rate Measurement State. However, in alternative embodiments, the Power Saving State 303 can comprise a number of states, for example Limited Rate Measurement State 801 and Lower Rate Measurement State 803 as depicted in the state transition diagram of FIG. 8.

In this exemplary embodiment, entry into the Power Saving State 303 from the Full Rate Measurement State 301 is made into the Limited Rate Measurement State 801. In this state, measurements on the UE's surroundings are performed at a lower rate than in the Full Rate Measurement State 301. The UE continues to determine and analyze the trend lines of measurements from the serving cell and from the measured surroundings, and remains in the Limited Rate Measurement State 801 for so long as these measurements remain substantially stable. Operation of the UE changes back to the Full Rate Measurement State 301 if either of the following conditions are true (state transition 805):

The trend lines representing the average measure of the serving cell and representing the average measure of the surroundings are converging.

The momentary measured value of the serving cell falls to or below a given value, $Thresh_{min\_LtdRate}$, where $Thresh_{min\_LtdRate}$ can for example be a dynamically determined value (e.g., the best measured value of serving cell during Limited Rate Measurement State 801 minus a fixed value—e.g., −3 dB—); alternatively, $Thresh_{min\_LtdRate}$ could be a static value, such as the measured value of the measured surroundings just prior to entering the Limited Rate Measurement State 801. In other alternatives, $Thresh_{min\_LtdRate}$ can be derived from a combination of both static and dynamically determined values.

The momentary value of the measured surroundings improves by a given amount.

On the other hand, if the UE detects in increasing divergence between the trend lines representing the average measure of the serving cell and representing the average measure of the surroundings are converging, then operation of the UE can change (state transition 807) to an even lower power consuming state, the Lower Rate Measurement State 803. As used herein, the term "increasing divergence" includes the case of the trend lines initially being parallel to one another and then beginning to diverge from one another.

In the Lower Rate Measurement State 803, the UE no longer makes any measurements of the surroundings. To determine whether to remain in the Lower Rate Measurement State 803, the UE analyzes momentary measured values of the serving cell. If the measured values of the serving cell indicate a sufficient degradation of quality (state transition 809), then the UE's operation returns to the Full Rate Measurement State 301. Sufficient degradation of quality in this case could, for example, be indicated by any of the following, either alone or in combination:

The momentary measured value of the serving cell falling to or below a given value, $Thresh_{min\_LowerRate}$, where $Thresh_{min\_LowerRate}$ can for example be a dynamically determined value (e.g., the best measured value of serving cell during Lower Rate Measurement State 803 minus a fixed value—e.g., −3 dB—); alternatively, $Thresh_{min\_LowerRate}$ could be a static value, such as the measured value of the measured surroundings just prior to entering the Limited Rate Measurement State 801. In other alternatives, $Thresh_{min\_LowerRate}$ can be derived from a combination of both static and dynamically determined values.

The momentary measured value of the serving cell falling to or below the last known measured value of the measured surroundings just prior to entering the Limited Rate Measurement State 801.

In another aspect, a hysteresis can be added to state transitions in order to avoid having a system that, instead of settling into a state for any substantial period of time, "ping-pongs" back and forth between states. For example, the various embodiments described above can be modified such that once an unstable environment is detected, the UE operation transitions to the Full Measurement State 301 and then remains there for some predefined period of time regardless of any subsequent detection of a stable environment.

In another aspect, it is beneficial to implement threshold comparison modules in or close to the receiver module within the UE.

Various embodiments offer an environmentally adaptable way of decreasing power consumption of a UE. An advantage of the techniques described here is that, even in poor radio environments (e.g., with weak radio signals), unnecessary measurements are avoided in stable environments. By contrast, conventional techniques, which employ only static thresholds for determining when to change measurement states, often result in unnecessary measurements being made, even if the UE is, for example, placed on a table.

Another advantage is that, even in telecommunication environments in which the network in which the UE is participating is not signaling any of its own criteria for determining whether the UE should enter the Power Saving State 303, a UE practicing the invention is still able to make decisions about going into the Power Saving State 303.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating user equipment (UE) in a cellular telecommunications system, the method comprising:
   a controller causing the UE to begin operating in a power saving state by determining that a first set of predefined criteria have been satisfied; and the controller causing the UE to leave the power saving state by determining that a second set of predefined criteria have been satisfied, wherein determining that the first set of predefined criteria have been satisfied includes:

making a plurality of signal quality measurements of a signal received from a serving cell in the telecommunications system;

making a plurality of signal quality measurements of a signal received from one or more neighboring cells in the telecommunications system;

determining a first trend line from the signal quality measurements of the serving cell in the telecommunications system;

determining a second trend line from the signal quality measurements of the one or more neighboring cells in the telecommunications system; and determining that the first set of predefined criteria have been satisfied if the first and second trend lines are not converging.

2. The method of claim 1, comprising:

determining that the first set of predefined criteria have been satisfied if a current signal quality measurement satisfies a predetermined relationship with respect to a term derived from one or more telecommunication network-supplied parameters.

3. The method of claim 2, wherein the telecommunications system is a Wideband Code Division Multiple Access (WCDMA) telecommunications system, and the term derived from the one or more telecommunication network-supplied parameters is $S_{intrasearch}+\text{QqualMin}$, wherein $S_{intrasearch}$ is a parameter that specifies a threshold for intra-frequency measurements, and QqualMin defines a minimum required quality level within the serving cell.

4. The method of claim 1, wherein the power saving state comprises:

a limited rate measurement state in which the user equipment makes the plurality of signal quality measurements of the signal received from the one or more neighboring cells in the telecommunications system at a lower rate than in a full rate measurement state; and a lower rate measurement state in which the user equipment performs no measurements of the signal received from the one or more neighboring cells in the telecommunications system.

5. The method of claim 4, wherein causing the UE to begin operating in the power saving state comprises:

initially causing the UE to begin operating in the limited rate measurement state; and causing the UE to begin operating in the lower rate measurement state in response to detecting that the first and second trend lines are diverging at an increasing rate.

6. The method of claim 1, wherein:

determining the first trend line from the signal quality measurements of the serving cell in the telecommunications system comprises:

determining a moving average of the signal quality measurements of the serving cell in the telecommunications system; and determining the first trend line from the moving average of the signal quality measurements of the serving cell in the telecommunications system; and determining the second trend line from the signal quality measurements of the one or more neighboring cells in the telecommunications system comprises:

determining a moving average of the signal quality measurements of the one or more neighboring cells in the telecommunications system; and determining the second trend line from the moving average of the signal quality measurements of the one or more neighboring cells in the telecommunications system.

7. A method of operating user equipment (UE) in a cellular telecommunications system, the method comprising:

a controller causing the UE to begin operating in a power saving state by determining that a first set of predefined criteria have been satisfied; and the controller causing the UE to leave the power saving state by determining that a second set of predefined criteria have been satisfied, wherein determining that the first set of predefined criteria have been satisfied includes:

making a plurality of signal quality measurements of a signal received from a serving cell in the telecommunications system;

making a plurality of signal quality measurements of a signal received from one or more neighboring cells in the telecommunications system;

determining a first long trend line from the signal quality measurements of the serving cell in the telecommunications system;

determining a first short trend line from the signal quality measurements of the serving cell in the telecommunications system;

determining a second long trend line from the signal quality measurements of the one or more neighboring cells in the telecommunications system;

determining a second short trend line from the signal quality measurements of the one or more neighboring cells in the telecommunications system; and determining that the first set of predefined criteria have been satisfied if the first and second long trend lines are not converging and the first and second short trend lines are not converging.

8. The method of claim 7, comprising:

determining that the first set of predefined criteria have been satisfied if the first and second long trend lines are not converging and the first and second short trend lines are converging at a rate that is lower than a predetermined slow rate.

9. An apparatus for operating user equipment (UE) in a cellular telecommunications system, the apparatus comprising:

logic adapted to cause the UE to begin operating in a power saving state by determining that a first set of predefined criteria have been satisfied; and logic adapted to cause the UE to leave the power saving state by determining that a second set of predefined criteria have been satisfied, wherein determining that the first set of predefined criteria have been satisfied includes:

making a plurality of signal quality measurements of a signal received from a serving cell in the telecommunications system;

making a plurality of signal quality measurements of a signal received from one or more neighboring cells in the telecommunications system;

determining a first trend line from the signal quality measurements of the serving cell in the telecommunications system;

determining a second trend line from the signal quality measurements of the one or more neighboring cells in the telecommunications system; and determining that the first set of predefined criteria have been satisfied if the first and second trend lines are not converging.

10. The apparatus of claim 9, comprising:

logic adapted to determine that the first set of predefined criteria have been satisfied if a current signal quality measurement satisfies a predetermined relationship with respect to a term derived from one or more telecommunication network-supplied parameters.

11. The apparatus of claim 10, wherein the telecommunications system is a Wideband Code Division Multiple Access (WCDMA) telecommunications system, and the term derived from the one or more telecommunication network-supplied parameters is $S_{intrasearch}$+QqualMin, wherein $S_{intrasearch}$ is a parameter that specifies a threshold for intra-frequency measurements, and QqualMin defines a minimum required quality level within the serving cell.

12. The apparatus of claim 9, wherein the power saving state comprises:

a limited rate measurement state in which the user equipment makes the plurality of signal quality measurements of the signal received from the one or more neighboring cells in the telecommunications system at a lower rate than in a full rate measurement state; and a lower rate measurement state in which the user equipment performs no measurements of the signal received from the one or more neighboring cells in the telecommunications system.

13. The apparatus of claim 12, wherein the logic adapted to cause the UE to begin operating in the power saving state comprises:

logic adapted to initially cause the UE to begin operating in the limited rate measurement state; and logic adapted to cause the UE to begin operating in the lower rate measurement state in response to detecting that the first and second trend lines are diverging at an increasing rate.

14. The apparatus of claim 9, wherein:

determining the first trend line from the signal quality measurements of the serving cell in the telecommunications system comprises:

determining a moving average of the signal quality measurements of the serving cell in the telecommunications system; and determining the first trend line from the moving average of the signal quality measurements of the serving cell in the telecommunications system; and determining the second trend line from the signal quality measurements of the one or more neighboring cells in the telecommunications system comprises:

determining a moving average of the signal quality measurements of the one or more neighboring cells in the telecommunications system; and determining the second trend line from the moving average of the signal quality measurements of the one or more neighboring cells in the telecommunications system.

15. An apparatus for operating user equipment (UE) in a cellular telecommunications system, the apparatus comprising:

logic adapted to cause the UE to begin operating in a power saving state by determining that a first set of predefined criteria have been satisfied; and logic adapted to cause the UE to leave the power saving state by determining that a second set of predefined criteria have been satisfied, wherein determining that the first set of predefined criteria have been satisfied includes:

making a plurality of signal quality measurements of a signal received from a serving cell in the telecommunications system;

making a plurality of signal quality measurements of a signal received from one or more neighboring cells in the telecommunications system;

determining a first long trend line from the signal quality measurements of the serving cell in the telecommunications system;

determining a first short trend line from the signal quality measurements of the serving cell in the telecommunications system;

determining a second long trend line from the signal quality measurements of the one or more neighboring cells in the telecommunications system;

determining a second short trend line from the signal quality measurements of the one or more neighboring cells in the telecommunications system; and determining that the first set of predefined criteria have been satisfied if the first and second long trend lines are not converging and the first and second short trend lines are not converging.

16. The apparatus of claim 15, wherein determining that the first set of predefined criteria have been satisfied includes:

determining that the first set of predefined criteria have been satisfied if the first and second long trend lines are not converging and the first and second short trend lines are converging at a rate that is lower than a predetermined slow rate.

* * * * *